Nov. 25, 1952   P. WILLEMS   2,619,330
MIXING AND DISPERSING DEVICE
Filed Aug. 19, 1950

INVENTOR.
Peter Willems
BY
AG'T

Patented Nov. 25, 1952

2,619,330

UNITED STATES PATENT OFFICE 2,619,330

MIXING AND DISPERSING DEVICE

Peter Willems, Nordenau, near Winterberg, Westphalia, Germany

Application August 19, 1950, Serial No. 180,361
In Germany September 9, 1949

8 Claims. (Cl. 259—96)

The purpose of this device is to produce mixtures of a very high fine count, colloidal solutions and true suspensions and stable emulsions, also to achieve the greatest possible surface of the treated material.

My invention relates to a mixing and dispersing device of the turbo-type. Its construction improves the methods of emulsifying and dispersing.

Description.—The system employed according to the invention to attain the highest efficiency consists in forcing and whipping the raw mixture at a high velocity and under high pressure through several rings of teeth which are fixed on two base discs. These base discs are rotating around a common axis. For this purpose one of them is fixed on a central shaft while the second is fixed on a tubular bearing shaft in which the central shaft rotates. Both shafts may be driven in opposite direction, but one of them may be fixed, too, while only one of them, preferably the central shaft, rotates.

The rings of teeth are arranged concentrically around the shafts. Into the space between two rings of teeth of one of the discs engages always one ring of teeth of the other disc in such a manner that the teeth do not contact, but leave a small slot between themselves. The inner ring of teeth is fixed on a rotating disc which is preferably driven by the central shaft. The outside ring of teeth is fixed on the periphery of the other disc. It closes like a cage the apparatus and protects against contact with the inner revolving rings of teeth. The teeth may have any form which will render the work more effective. So they may be round, flat, prismatic, bored, etc. They may also be arranged on their base discs radially and in a straight line or in any staggered manner which will increase the efficiency of the apparatus.

The disc which is driven by the central shaft may be equipped with a centrifugal pump. This centrifugal pump is fixed around the shaft and improves the pulling in of the raw mixture into the chamber between the two discs and presses it with a high velocity between the teeth of the two discs.

The revolving teeth seize the mixture and fling it against the teeth which are fixed or which rotate in opposite direction and press it through the small slits between these teeth, smashing it up. The passing of mixture through the small slits at a high velocity and under high force causes a high pressure at the entrance into the slits and a low pressure at the exit end of the slits. At very high rotation speed the frequency of the said difference of pressure reaches the efficiency of ultra-sound oscillations and causes together with the frequent violent impacts upon the mixture the disintegration of the particles.

The apparatus can be constructed as a portable device or as an aggregate which can be fixed on stands, on trolleys, on liquid containers, agitators, pipelines, in casings etc. in any position which will be of use.

Figure 1:
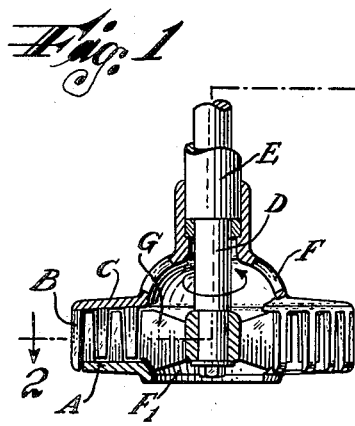
Fig. 1 is a section taken in elevation through an apparatus according to my invention.
Figure 3:
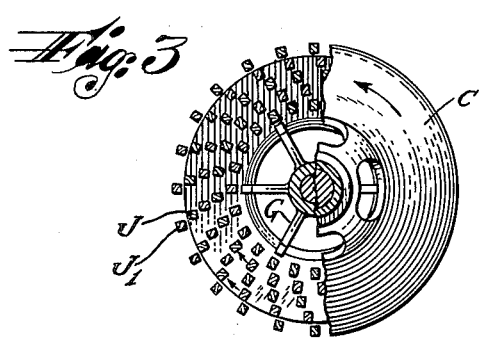
Fig. 3 is a view similar to that of Fig. 2 but showing a modified teeth arrangement.
Figure 2:
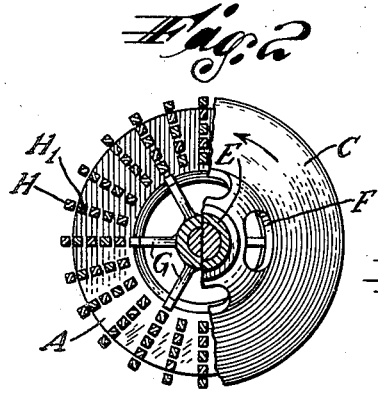
Fig. 2 is a partial transverse section taken in the plane of the line 2—2 of Fig. 1.

Referring to the drawing in greater detail, A is the rotating disc which is driven by the central shaft D. B is a tooth of the peripherical ring of teeth. C is the disc which is fixed on the tubular shaft E. F and $F_1$ are inlets to the chamber between the two discs. G are propelling blades of a centrifugal pump. In the horizontal section: H is a tooth of the peripherical ring of teeth of the disc C, $H_1$ a tooth of the disc A; both of them are standing in a rectilinear and radial form. J is a tooth of the disc A, $J_1$ a tooth of the disc C. Both of them show as an example a staggered arrangement of the teeth.

Figure 4:
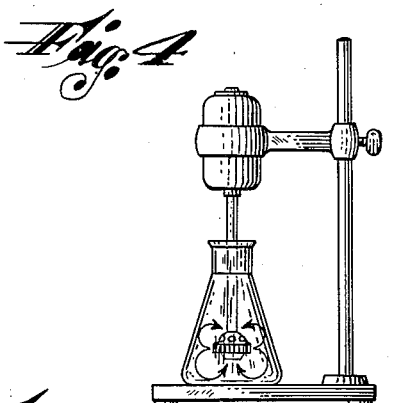
Fig. 4 is an elevational view illustrating an application of my apparatus.

Fig. 4 shows the invention in its application as a heavy duty laboratory disperser fixed on a stand. In that form of construction the tubular shaft is fixed on the casing of the motor while the central shaft is driven by the rotor of the motor.

Figure 5:
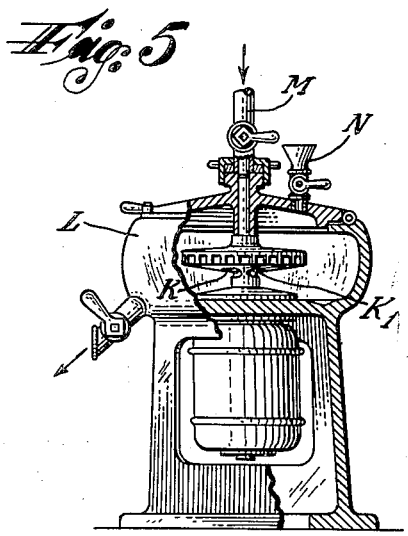
Fig. 5 is a partially sectional elevation, with parts being broken away, illustrating another application of my apparatus.

Fig. 5 shows the apparatus being arranged in a casing. The purpose of this arrangement is the continuous treatment of the mixture, which is introduced through the inlet M into the apparatus. After being treated, the dispersed or emulsified mixture is thrown out at the periphery of the apparatus and falls into the casing L from which it is withdrawn through the outlet. To treat the mixture more intensively or a longer time, the valve of the outlet may be closed or opened partially only. In this way the casing L will be filled with the mixture which will be sucked by the centrifugal pump through the inlets K and K₁ and will be treated in the apparatus as often and as long as necessary, circulating through the same way until the outlet will be opened. Regulation of a continuous passage and treatment of the mixture may be obtained by partial opening of the outlet stop-valve. The valve at N serves to evacuate the air out of the casing L when the stop-valve is closed and the mixture is rising in the casing.

Figure 6:
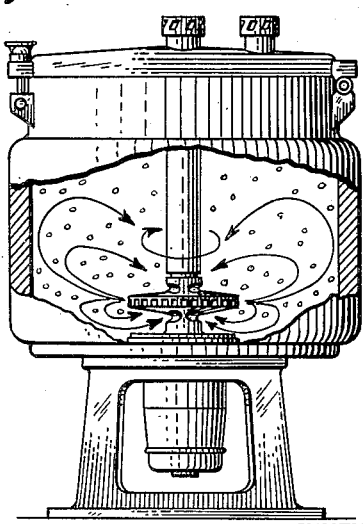
Fig. 6 is an elevation illustrating still another application, parts being broken away.

Fig. 6 shows my apparatus fixed on the bottom of an agitator. In this example the introduction of air from outside into the mixture being treated in the apparatus is shown. In this way gases and chemicals may also be introduced into the mixture while it is being treated. Thus, a continuous addition of air, gases or chemicals and an exact regulation of chemical reactions may be obtained. The said additives may be sucked by the centrifugal effect of the apparatus or may be introduced by any device which will be of use for this purpose.

I claim:

1. Mixing and dispersing device comprising two parallel and relatively rotatable discs, two shafts, the discs forming a central chamber between them and being centrally secured to the shafts, one of the shafts being tubular and having arranged within, and serving as a bearing for, the other shaft, a centrifugal pump arranged in said chamber and including propeller blades extending substantially radially and carried by one of the shafts, the propeller blades terminating at a distance from the circumferences of the discs, the discs being provided on their inner faces outside the centrifugal pump area with spaced concentric rows of spacedly and circularly arranged teeth, the teeth of either disc between the teeth of the outermost and innermost rows projecting into the spaces between adjacent rows of teeth of the other disc, the teeth being shaped and arranged to form material-impacting flanks extending generally radially, the spaces between the teeth of the outermost row forming material discharge openings around the entire periphery of the device.

2. In the device according to claim 1, a motor adjustably carried by a stand, the tubular outer shaft being secured to the motor casing, the central shaft being operatively connected with the motor for rotating the propelling blades and one of the discs.

3. In the device according to claim 1, material feed openings on top and on the bottom of the device, and feed passageways leading from said openings to said chamber.

4. In the device according to claim 1, the disc carrying the outermost row of teeth and the teeth of said outermost row being shaped to form together with the other disc a housing-like enclosure for the device.

5. In the device according to claim 4, said first named disc being secured to the tubular outer shaft and forming the upper disc of the two discs.

6. In the device according to claim 1, the teeth of the two discs being provided so as to form in an interstitial relation radially extending series of alternatedly projecting teeth.

7. In the device according to claim 1, one of the discs being arranged for rotation, the teeth of the discs being provided so as to form in an overlapping relation series of alternatedly projecting teeth, said series running along lines extending from their outer ends rearwardly with respect to the rotational direction.

8. In combination with the device according to claim 1, a container holding the material to be treated, with the device immersed in the material, an outlet in said container, and means to control said outlet.

PETER WILLEMS.

REFERENCES CITED

The following references are of record in the file of this patent:

UNITED STATES PATENTS

| Number | Name | Date |
|---|---|---|
| 1,515,798 | Spensley | Nov. 18, 1924 |
| 1,711,154 | Michael | Apr. 30, 1929 |
| 1,771,321 | Snow | July 22, 1930 |
| 2,328,950 | Brant | Sept. 7, 1943 |